Patented Oct. 31, 1944

2,361,754

UNITED STATES PATENT OFFICE 2,361,754

BASE EXCHANGE BODIES AND THE PREPARATION OF THE SAME

Rolland McFarland, Jr., Chicago, Ill.

No Drawing. Application January 24, 1939,
Serial No. 252,543

2 Claims. (Cl. 260—49)

The present invention is directed to materials adapted for use as base exchange bodies for the removal from liquids, such as water, of undesirable constituents.

It is well known that certain zeolites, both natural and artificial, have the property of base exchange, that is, of taking up certain bases under one set of conditions and reversing the process under other conditions. Thereby it has become possible to remove from water, for example, certain soluble compounds of magnesium, calcium, and the like, exchanging the same for sodium or the like originally present in the base exchange body. Thereafter, said body may be treated under different conditions with a compound of sodium, for example, such as sodium chloride, whereby the calcium, magnesium or the like is replaced by the sodium and the base exchange body is thereby rendered available for further use.

It has also been known that various organic compounds are also suitable for similar purposes in that they have to a certain extent base exchange properties. Among such organic compounds it was found that resins formed from phenylenediamine and formaldehyde had the property of removing anions from solutions. Similarly, other resins, such as the reaction product of tannin and formaldehyde, were found to have base exchange properties. Another type of resin previously proposed consisted in the reaction product of formaldehyde with polyhydric phenols. However, it was stated that monohydric phenols condensed with formaldehyde or the like to form resinous products did not have any appreciable base exchange properties. Therefore, the prior art considered that resins made from monohydric phenols and formaldehyde, for example, were of no value whatsoever as far as base exchange properties was concerned.

The present invention is directed to the application of resins of the phenol-aldehyde type as base exchange bodies. Principally, it has been found that although as stated in the prior art, resins made from phenols and formaldehyde have no base exchange properties, if resins of this general character are sulphonated under suitable conditions, the resulting products have very valuable base exchange properties and are capable not only of use in purifying solutions, but are readily capable of being regenerated whereby such materials may be re-used indefinitely.

In the present invention, the character of the phenol formaldehyde resin is not of great importance. That is, one may take a resin of this type whether it is in an initial stage wherein it is soluble and fusible, or whether it is in a final stage where it is no longer utilizable. It is also immaterial whether the phenol formaldehyde resin is pure or is mixed with filling materials, such as are commonly used in the art, including wood flour, rag pulp, cotton linters, or the like. Such materials may be utilized in the present invention provided only that there is a sufficient amount of the resin in the material to make commercially feasible the subsequent sulfonating operations.

In the sulphonation, I may use substances which have long been known for sulphonating various organic materials, and the following is a specific description of one method of operation:

100 grams of ground phenol-formaldehyde resin was stirred into 500 cc. of concentrated sulphuric acid and agitation continued until the exothermic reaction started. The mass was then heated for a definite length of time, and the whole allowed to cool to room temperature. The mass of material was then poured into a large volume of water. The process of washing was continued until the resinous material was free of excess acid. The material was again washed on a suction filter and the resin dried at 220–240° F.

As stated before, this material has marked base exchange properties, and possesses adsorptive powers for many metallic ions from alkaline, neutral or acid aqueous and other solutions. This material is not soluble in either an alkaline, neutral or acid solution.

As an example, strong solutions of calcium chloride can be passed through a column of this modified resin and the calcium completely removed, with the effluent from the column containing only sodium chloride or hydrochloric acid, depending on whether one is operating the column on the sodium or hydrogen cycle respectively. This adsorbed calcium cannot be washed out with water, but it can be removed by passing a solution of the proper strength of sodium chloride, hydrochloric acid or sulphuric acid through the column until all of the calcium is completely removed.

In the above description I have set forth in detail the application of a fully reacted or polymerized phenol formaldehyde resin in the pure state. It is, of course, apparent that I may utilize a resin in any stage from the formation of the saligenins, through the oil soluble stage, the fusible stage, and all the way through to the final polymerized stage. The presence of a filler such as wood flour, asbestos or the like does not interfere with the sulphonating operation, nor with the utilization of the sulphonated product thereafter. Furthermore, although I have found that substantially all phenol-aldehyde resins are utilizable in the present invention, I prefer to use the resinous products of condensation of monohydric phenols with aldehydes, specifically, formaldehyde.

Although I have described my invention setting forth a single specific embodiment thereof, it will be apparent to those skilled in the art that the present invention is not limited to the details of the process as described, nor to the proportions of the ingredients. For example, instead of using sulphuric acid, other mixtures or materials capable of producing sulphonation in the resins may be substituted therefor. There is nothing critical about the conditions under which the sulphonation takes place and a wide variety of conditions such as is known in the art may be utilized for this purpose. It is, however, essential for the present invention that the resin have a substantial amount of sulphonation as the result of the process. Although only phenol has been mentioned specifically herein, it is intended that this term include the various phenols such as are known as constituents of phenol formaldehyde resins. In view of the above, the invention is not to be limited to the details set forth herein, but is to be broadly construed and to be limited only the character of the claims appended hereto.

What I claim is:

1. As a water softening reagent, a product, insoluble in neutral, alkaline and acid solutions and containing a substantial amount of sulfonation, resulting from the sulfonation by means of concentrated sulfuric acid of ground monohydric phenol-formaldehyde resin which is infusible and in the final polymerized stage prior to sulfonation.

2. The process of preparing a base exchange material comprising sulfonating a ground, infusible, mono-phenol-formaldehyde resin in the final polymerized stage with concentrated sulfuric acid until a product is obtained which is not soluble in alkaline, neutral or acid solutions and contains a substantial amount of sulfonation.

ROLLAND McFARLAND, Jr.